Figure 1:
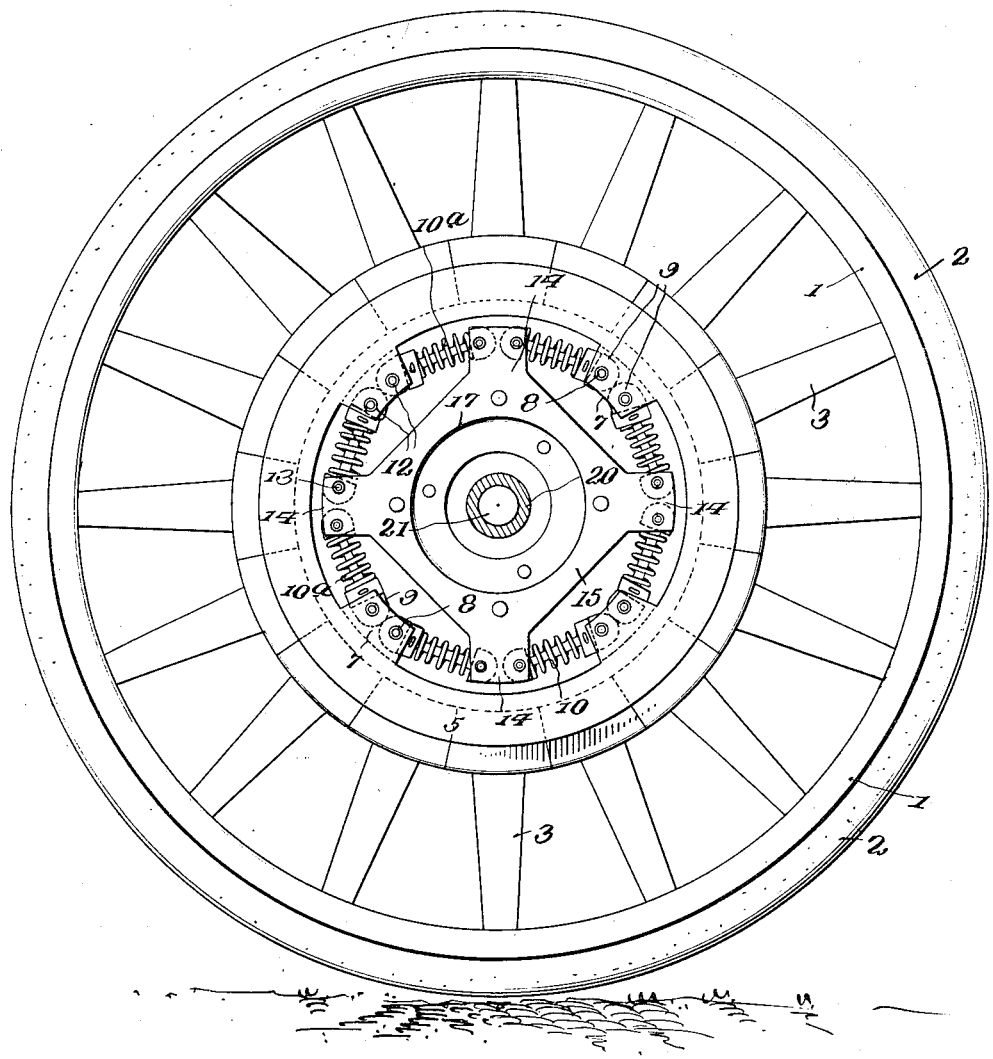

B. ANDERSON & C. L. MILES.
RESILIENT WHEEL.
APPLICATION FILED SEPT. 16, 1910.

1,046,712.

Patented Dec. 10, 1912.
2 SHEETS—SHEET 1.

Witnesses
W. N. Woodson.
Juana M. Fallin.

Inventors
B. Anderson
C. L. Miles
By
R. H. & A. B. Lacey, Attorneys.

B. ANDERSON & C. L. MILES.
RESILIENT WHEEL.
APPLICATION FILED SEPT. 16, 1910.
1,046,712.
Patented Dec. 10, 1912.
2 SHEETS—SHEET 2.
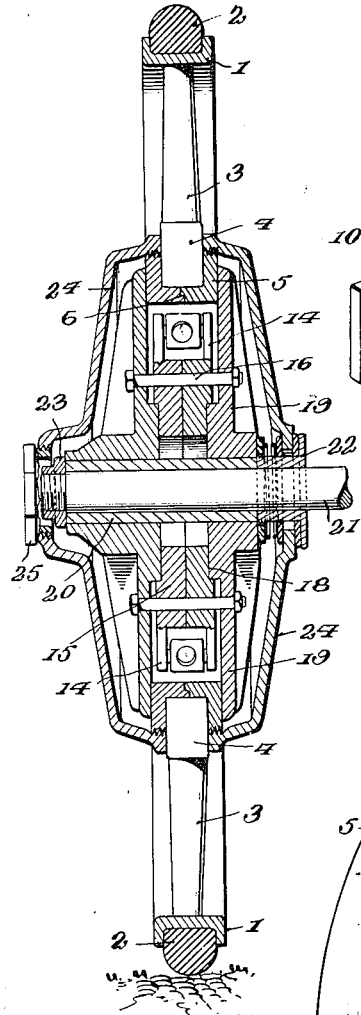
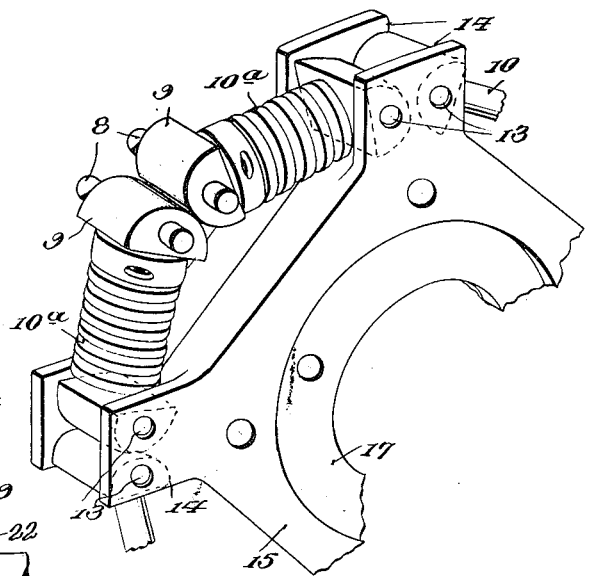
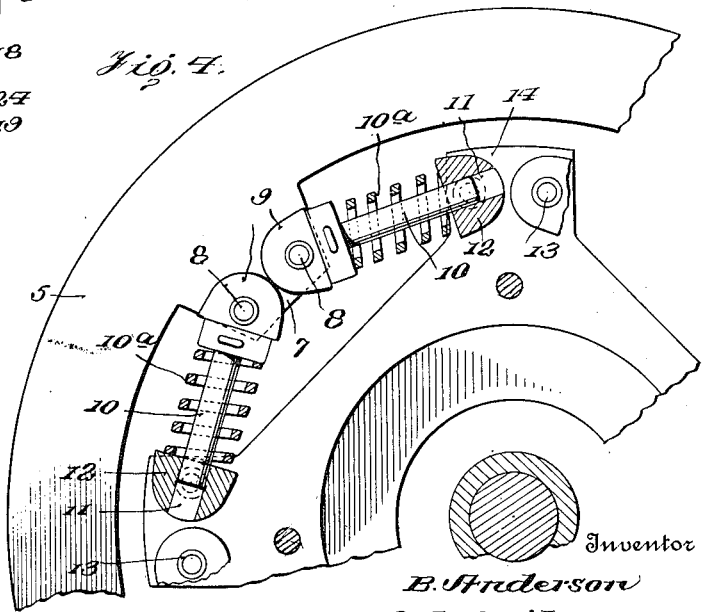
Witnesses
W. T. Woodson
Juana M. Fallin
Inventor
B. Anderson
C. L. Miles
By Hoan Macey, Attorneys

UNITED STATES PATENT OFFICE.

BEDOLPH ANDERSON AND CLYDE L. MILES, OF BOSTON, MASSACHUSETTS.

RESILIENT WHEEL.

1,046,712.  Specification of Letters Patent.  Patented Dec. 10, 1912.

Application filed September 16, 1910. Serial No. 582,425.

*To all whom it may concern:*

Be it known that we, BEDOLPH ANDERSON and CLYDE L. MILES, citizens of the United States, residing at Dorchester, Boston, in the county of Suffolk and State of Massachusetts, have invented certain new and useful Improvements in Resilient Wheels, of which the following is a specification.

This invention has for its primary object an improved construction of wheel which will possess the required resiliency to secure comfort to the occupants of the vehicle equipped with wheels of this make, the shock and jar incidental to the ordinary traveling along the roads being effectually absorbed, and without the use or necessity of pneumatic or other tires which are so liable to become punctured or otherwise damaged and rendered unfit for use.

With this and other objects in view as will more fully appear as the description proceeds, the invention consists in certain constructions, arrangements and combinations of the parts that we shall hereinafter fully describe and claim.

For a full understanding of the invention, reference is to be had to the following description and accompanying drawings, in which—

Figure 1 is a side elevation of a wheel embodying the improvements of our invention, parts being omitted to better show the interior construction. Fig. 2 is a diametrical transverse sectional view of the wheel; Fig. 3 is an enlarged fragmentary perspective view of the hub block and some of its concomitant parts; and Fig. 4 is an enlarged side elevation with parts in section, of a portion of said hub block and the rim which encircles the same, together with the interposed resilient elements.

Corresponding and like parts are referred to in the following description and indicated in all the views of the drawings by the same reference characters.

Referring to the drawings, the numeral 1 designates the felly of our improved resilient wheel, the same being of any desired construction, type or design, and being equipped with any construction of tire 2, a solid cushion rubber tire being indicated in the present instance, although it is to be understood that our invention is not limited to the use of a resilient tire as we do not depend upon the same, but upon the interior construction of the wheel, to secure the required resiliency.

Any desired number and construction of spokes 3 are employed and extend inwardly from the rim 1 and in the present instance (although the invention is not limited thereto) the butts 4 of the spokes are enlarged and engage directly with each other solidly all around the wheel. The butt ends of the spokes 3 are received in a channeled rim 5 which is constructed in two annular sections laid side by side on opposite sides of the spokes and preferably interlocked by a scarf joint as indicated at 6. The channeled rim 5 is formed with any desired number of pairs of inwardly projecting bearing lugs 7 which are formed with openings to receive the trunnions 8 of substantially semi-cylindrical heads 9, the heads being thus mounted to rock against each other in said openings. Stems 10 are carried by the respective trunnion heads 9 and extend in opposite directions, as shown, the ends of said stems being mounted for movement in openings 11 formed in heads 12 corresponding to the heads 9. The heads 12 are formed at opposite sides with trunnions 13 by which they are journaled in outwardly projecting bearing lugs 14 formed on a hub block 15 which is constructed in two sections, as clearly illustrated in the drawings, and held together by transverse bolts 16. These hub block sections are each formed with an annular recess 17 in its outer face, and said recesses are designed to receive and support circular bosses 18 that are formed on the inner faces of hub plates 19. These hub plates are of such a diameter that their outer edges extend over and are arranged to slide upon the opposite side faces of the channeled rim 5, as best illustrated in Fig. 2. The hub plates 19 are bored to receive a bushing 20 which surrounds the axle 21 and at the inner end of the bushing the axle 21 is loosely surrounded by a dust excluding sleeve 22, as best seen in Fig. 2, while at the opposite side of the wheel, a retaining nut 23 is screwed or otherwise secured to the spindle or axle 21.

24 designates cap plates that inclose substantially all of the parts hereinbefore described, said cap plates being secured in the present instance as by screw threaded engagement, as shown, to the outer edges of the sections of the channel rim 5.

Preferably the outer cap plate 24 is closed by a threaded plug 25. The loose sleeve 22 is provided at its outer end with an integral flange 26 and a detachable flange 27 at the inner end, the detachable flange being preferably threaded upon the sleeve, and bearing against the inner end of the hub portion of the member 19.

The sleeve 22 is surrounded by yieldable washers 28—29 of leather, rubber or like material which bear against opposite sides of the inner member 24, while a spring 30 is located between the washer 29 and the inner flange 27. The sleeve 22 is thus maintained in position relative to the closure 24 and the latter "packed" where the axle passes through and also between the sleeve and " hub " portions of the wheel. The threaded cap 25 and the sleeve 22 together with its " packing " elements seal the opposite ends of the chamber formed by the caps 24 and effectually prevent the entrance of dust, water or the like, while at the same time retain a lubricant within the chamber. The lubricant thus has free access to all moving parts of the wheel, while at the same time cannot escape between the wheel and the axle.

It will be noted that each pair of the heads 9 roll together when sufficient pressure is applied to the wheel to cause the deflection of the rim and thus relieve the trunnions 12 largely from strain. This is an important feature of applicant's device and materially increases its efficiency and utility.

From the foregoing description in connection with the accompanying drawings, the operation of our improved resilient wheel will be apparent.

In the practical use of the device, it is manifest that any shock or stress imposed on the wheel at any point will be taken up, absorbed and compensated for by the spring connection between the hub and the rim of the wheel, said connection comprising the rocking heads 9 and 12, the stems 10 carried thereby and the springs 10ª which, as shown, encircle the stems and which tend to move the stems longitudinally partially out of their bearings in the openings 11.

Having thus described the invention, what is claimed as new is:

1. A wheel comprising an outer rim and an inner rim connected by spokes, said inner rim having a plurality of inwardly directed projections, an annular hub block having a plurality of outwardly directed projections, means adapted to mount said hub block upon an axle journal, two heads pivoted to the projections of the inner rim and with their contiguous faces concentric to the pivots and in contact, two heads pivoted to the projections of the hub block and each provided with a guide aperture, a stud projecting from each of the pivoted heads of the inner rim and extending respectively through the guide apertures of the pivoted heads of the hub block, and springs arranged respectively between the heads of the inner rim and the heads of the hub block.

2. A wheel comprising an outer rim and an inner rim connected by spokes, said inner rim having a plurality of projections, an annular hub block having a plurality of outwardly directed projections, means adapted to mount said hub block upon an axle journal, two heads pivoted to the projections of the inner rim, two heads pivoted to the projections of the hub block and each provided with a guide aperture, a stud projecting from each of the pivoted heads of the inner rim and extending respectively through the guide apertures of the pivoted heads of the hub block, and springs arranged respectively between the heads of the inner rim and the heads of the hub block.

3. A wheel comprising an outer rim and an inner rim connected by spokes, said inner rim having a plurality of pairs of inwardly directed ears, an annular hub block having a plurality of pairs of outwardly directed ears, means adapted to mount said hub block upon an axle journal, two heads pivoted between each pair of the ears of the inner rim and with their contiguous faces concentric to the pivots and in contact, two heads pivoted between each pair of the ears of the hub block and each provided with a guide aperture, a stud projecting from each of the pivoted heads of the inner rim and extending respectively through the guide apertures of the pivoted heads of the hub block, and springs arranged respectively between the heads of the inner rim and the heads of the hub block.

4. A wheel comprising an outer rim and an inner rim connected by spokes, said inner rim having a plurality of pairs of inwardly directed ears, an annular hub block having a plurality of pairs of outwardly directed ears, means adapted to mount said hub block upon an axle journal, two heads pivoted between each pair of the ears of the inner rim, two heads pivoted between each pair of the ears of the hub block and each provided with a guide aperture, a stud projecting from each of the pivoted heads of the inner rim and extending respectively through the guide apertures of the pivoted heads of the hub block, and springs arranged respectively between the heads of the inner rim and the heads of the hub block.

5. A wheel comprising a hub, a bushing carried in the hub, a rim concentric to the hub, cap plates extending over the ends of the hub and threaded upon the rim and having openings therethrough for the reception of an axle, a threaded plug engaging in the central opening of the outer cap plate, a floating packing washer extending around the bushing and against the inner side of the inner cap plate to close the opening through the same, and a resilient member arranged between the hub and the floating washer.

In testimony whereof, we affix our signatures in presence of two witnesses.

BEDOLPH ANDERSON. [L. S.]
CLYDE L. MILES. [L. S.]

Witnesses:
  JAMES BROWN,
  DAVID JOHNSON.